US011849711B2

United States Patent
Lu

(10) Patent No.: US 11,849,711 B2
(45) Date of Patent: Dec. 26, 2023

(54) PET WATER DISPENSING DEVICE, PET DRINKING AND EATING DISC, WATER DISPENSER, AND PET FOOD SUPPLY METHOD

(71) Applicants: Foshan Shunde Midea Water Dispenser Manufacturing Co., Ltd., Foshan (CN); MIDEA GROUP CO., LTD., Foshan (CN)

(72) Inventor: Dahong Lu, Foshan (CN)

( * ) Notice: Subject to any disclaimer, the term of this patent is extended or adjusted under 35 U.S.C. 154(b) by 362 days.

(21) Appl. No.: 17/290,989

(22) PCT Filed: Jan. 29, 2019

(86) PCT No.: PCT/CN2019/073591
§ 371 (c)(1),
(2) Date: May 3, 2021

(87) PCT Pub. No.: WO2020/093611
PCT Pub. Date: May 14, 2020

(65) Prior Publication Data
US 2022/0030830 A1 Feb. 3, 2022

(30) Foreign Application Priority Data

Nov. 5, 2018 (CN) .......................... 201811308680.8
Nov. 5, 2018 (CN) .......................... 201811309350.0
(Continued)

(51) Int. Cl.
*A01K 7/02* (2006.01)
(52) U.S. Cl.
CPC ..................................... *A01K 7/02* (2013.01)
(58) Field of Classification Search
CPC .......... A01K 7/02; A01K 7/022; A01K 7/025; A01K 7/06; A01K 7/00
See application file for complete search history.

(56) References Cited

U.S. PATENT DOCUMENTS 3,802,395 A * 4/1974 von Taschitzki ........ A01K 7/02
119/75
3,903,845 A * 9/1975 Little ....................... A01K 7/02
119/81
(Continued)

FOREIGN PATENT DOCUMENTS

CN 2097517 U 3/1992
CN 2436471 Y 6/2001
(Continued)

OTHER PUBLICATIONS

First OA dated Mar. 29, 2023 regarding CN Application No. 201811308680.8.
(Continued)

*Primary Examiner* — Kristen C Hayes
(74) *Attorney, Agent, or Firm* — KILPATRICK TOWNSEND & STOCKTON, LLP

(57) ABSTRACT

Disclosed are a pet water dispensing device, a pet drinking and eating disc, a water dispenser, and a pet food supply method. The pet water dispensing device includes a base and a water supply valve, a drinking and eating disc accommodating cavity is formed on at least one side surface of the base, the water supply valve corresponding to the drinking and eating disc accommodating cavity is disposed on the base, the water outlet end of the water supply valve communicates with the drinking and eating disc accommodating cavity, when the extension end of the valve rod of the water supply valve is configured to be driven by the pet drinking and eating disc placed at the drinking and eating disc accommodating cavity, the water supply valve is switched from a closed state to an open state.

14 Claims, 8 Drawing Sheets

(30) Foreign Application Priority Data

Nov. 5, 2018 (CN) .......................... 201821816461.6
Nov. 5, 2018 (CN) .......................... 201821822299.9

(56) References Cited

U.S. PATENT DOCUMENTS

| | | | |
|---|---|---|---|
| 4,085,706 A | | 4/1978 | Evans |
| 4,347,809 A | * | 9/1982 | Gloggler ............. A01K 7/02 119/81 |
| 4,394,847 A | * | 7/1983 | Langenegger ........ A01K 7/02 137/414 |
| 4,397,266 A | * | 8/1983 | Noland ............... A01K 7/06 119/73 |
| 5,086,818 A | | 2/1992 | Bendt |
| 5,501,178 A | | 3/1996 | Kemp |
| 8,464,661 B1 | | 6/2013 | Dunn et al. |
| 2005/0166853 A1 | | 8/2005 | Plante |
| 2021/0204512 A1 | * | 7/2021 | Xu ...................... A01K 7/02 |

FOREIGN PATENT DOCUMENTS

| | | |
|---|---|---|
| CN | 201135074 Y | 10/2008 |
| CN | 101361461 A | 2/2009 |
| CN | 101480168 A | 7/2009 |
| CN | 201360928 2 | 12/2009 |
| CN | 201451014 U | 5/2010 |
| CN | 201710147 U | 1/2011 |
| CN | 104472388 A | 4/2015 |
| CN | 204444671 U | 7/2015 |
| CN | 205691974 U | 11/2016 |
| CN | 106719037 A | 5/2017 |
| CN | 206547584 U | 10/2017 |
| CN | 207011479 U | 2/2018 |
| CN | 207699222 U | 8/2018 |
| CN | 207836463 U | 9/2018 |
| DE | 8222875 U1 | 11/1984 |
| EP | 1566099 A1 | 8/2005 |
| WO | 2007093460 A2 | 8/2007 |

OTHER PUBLICATIONS

First OA dated Mar. 29, 2023 regarding CN Application No. 201811309350.0.

* cited by examiner

PET WATER DISPENSING DEVICE, PET DRINKING AND EATING DISC, WATER DISPENSER, AND PET FOOD SUPPLY METHOD

The present application is a national phase of International Application No. PCT/CN2019/073591, filed on Jan. 29, 2019, which claims for the priority to the Chinese Patent Application No. 201811308680.8 filed on Nov. 5, 2018 and titled as "Pet Water Dispensing Device, Pet Drinking and Eating Disc, Water Dispenser, and Pet Food Supply Method"; the Chinese Patent Application No. 201821822299.9 filed on Nov. 5, 2018 and tilted as "Pet Water Dispensing Device, Pet Drinking and Eating Disc and Water Dispenser"; the Chinese Patent Application No. 201811309350.0 filed on Nov. 5, 2018 and titled as "Pet Water Dispensing Device, Pet Drinking and Eating Disc, Water Dispenser, and Pet Food Supply Method"; the Chinese Patent Application No. 201821816461.6 filed on Nov. 5, 2018 and titled as "Pet Water Dispensing Device, Pet Drinking and Eating Disc, and Water Dispenser", the contents of which are incorporated here by reference in entirety.

FIELD

The present application relates to the field of food and water supply, particularly to a pet water dispensing device, a pet drinking and eating disc, a water dispenser, and a pet food supply method.

BACKGROUND

With the improvement of the quality of life, more and more people like to keep pets, such as cats and dogs. Moreover, pet owners pay more and more attention to the hygiene of the drinking water for pets.

To meet that demand, a special pet water dispenser has emerged on the market. The pet water dispenser has a water tank, a purification module and a water-containing cavity. Thus, the water in the water tank is purified by the purification module and then flows into the water-containing cavity, so that the pet can lick and drink clean water.

However, such a pet water dispenser has some shortcomings, for example, the water-containing cavity is too small to meet the drinking demand of several pets at the same time; in addition, it is inconvenient to clean the water-containing cavity, because the water-containing cavity is not removable.

SUMMARY

In one embodiment of the present application is to provide a pet water dispensing device, which has a simple structure, and can decide whether to supply water to a pet drinking and eating disc placed in a drinking and eating disc accommodating cavity to meet the drinking demand of the pets according to whether the pet drinking and eating disc is connected with a water supply valve; in addition, the pet water dispensing device may be arranged on a person water dispenser to share the same water source.

Embodiments of the present application provides a pet water dispensing device, which comprises a base and a water supply valve, and a drinking and eating disc accommodating cavity is formed in at least one side surface of the base; the water supply valve corresponding to the drinking and eating disc accommodating cavity is arranged on the base, and a water outlet end of the water supply valve communicates with the drinking and eating disc accommodating cavity; when the extension end of a valve rod of the water supply valve is arranged to be driven by the pet drinking and eating disc at the drinking and eating disc accommodating cavity, the water supply valve is switched from a closed state to an open state.

In some embodiment, a drinking and eating disc accommodating cavity is formed in at least one side surface of the base, a pet drinking and eating disc may be placed in the drinking and eating disc accommodating cavity, and the water supply valve may be switched from a closed state to an open state when the pet drinking and eating disc drives the valve rod of the water supply valve, so that water flows through the water outlet end of the water supply valve into the pet drinking and eating disc for the pets to drink; the water supply valve is switched to the closed state and no water flows out from the water outlet end once the pet drinking and eating disc is moved away from the drinking and eating disc accommodating cavity. Of course, a water supply barrel may be placed on the pet water dispensing device, and the water inlet end of the water supply valve may be connected to the water supply barrel, and the pet water dispensing device may be arranged on a person water dispenser to share the same water source, so that men and pets can share the same water dispenser.

Furthermore, the water supply valve is arranged in a way that it can be switched from the open state to the closed state automatically once the pet drinking and eating disc placed at the drinking and eating disc accommodating cavity is removed.

Furthermore, the water outlet end extends into the drinking and eating disc accommodating cavity, and a snap-fitting structure configured to keep the pet drinking and eating disc in position is provided in the drinking and eating disc accommodating cavity.

Furthermore, a guide structure configured to guide the pet drinking and eating disc into the drinking and eating disc accommodating cavity and snap-fit with the snap-fitting structure is provided in the drinking and eating disc accommodating cavity.

Furthermore, the snap-fitting structure and the guide structure are formed on the same component.

Furthermore, a boss is formed on the central part of a bottom plate of the drinking and eating disc accommodating cavity, an inclined guide groove and a straight and level extension groove that communicate with each other sequentially are formed in the top surface of the boss, and a downward extending snap groove is formed in the bottom surface of the straight and level extension groove, and the snap groove serves as the snap-fitting structure, and the inclined guide groove serves as the guide structure.

Furthermore, the pet water dispensing device comprises a side cover plate, which can removably cover the drinking and eating disc accommodating cavity.

Furthermore, arc grooves arranged in a spaced manner are formed in the bottom plate of the drinking and eating disc accommodating cavity, and lock pieces are formed on the cavity wall of the drinking and eating disc accommodating cavity; arc clamp corners are formed on the bottom part of the inner surface of the side cover plate and rotatably fitted in the arc grooves, and latches that can be releasably locked to the lock pieces are formed on the inner surface of the side cover plate.

In addition, the pet water dispensing device comprises a push block slidably arranged on the base, and one end of the push block extends into the drinking and eating disc accommodating cavity so that it can be driven by the pet drinking and eating disc placed at the drinking and eating disc accommodating cavity, and the other end of the push block is connected to the valve rod in transmission.

Furthermore, the push block is connected with an elastic member, which starts to store energy when the push block is driven by the pet drinking and eating disc placed at the drinking and eating disc accommodating cavity.

Furthermore, the other end of the push block is connected with a push plate, the extension end of the valve rod is connected with an end plate, and the push plate and the end plate are at the same position and fitted with each other.

In addition, in the water supply valve, a spring sleeved on the valve rod is arranged between the valve rod and the valve shell of the water supply valve, and the spring stores energy when the water supply valve is switched from the closed state to the open state.

In addition, the drinking and eating disc accommodating cavity is provided on each of three side surfaces of the base; three water supply valves are arranged on the base, water inlet ends of the three water supply valves are connected to the same water feeding pipe, and a water outlet end of each of the water supply valves extends into a respective drinking and eating disc accommodating cavity corresponding to it, and the extension end of the valve rod of each water supply valve is arranged to be driven by the pet drinking and eating disc placed at the respective drinking and eating disc accommodating cavity corresponding to it.

Moreover, in a second aspect, the present application provides a pet drinking and eating disc, which comprises a disc body with an accommodating cavity formed therein and a driving insert removably arranged thereon, and when the driving insert is arranged on the disc body and the disc body is placed in the drinking and eating disc accommodating cavity of the pet water dispensing device, the driving insert drives the valve rod of the water supply valve of the pet water dispensing device; after the driving insert is moved away from the disc body, the disc body doesn't drive the valve rod of the water supply valve of the pet water dispensing device when the disc body is placed in the drinking and eating disc accommodating cavity of the pet water dispensing device.

Thus, when the driving insert is arranged on the disc body and the pet drinking and eating disc is placed in the drinking and eating disc accommodating cavity, the pet drinking and eating disc can drive the valve rod of the water supply valve, so that the water supply valve is switched from a closed state to an open state, and water flows through the water outlet end of the water supply valve into the pet drinking and eating disc for the pets to drink; the water supply valve is switched to the closed state once the pet drinking and eating disc is moved away from the drinking and eating disc accommodating cavity; after the driving insert is removed from the disc body, the pet drinking and eating disc can't drive the valve rod of the water supply valve when the pet drinking and eating disc is placed in the drinking and eating disc accommodating cavity because of absence of the driving insert; at that point, the water supply valve is in the closed state and no water flows out from the water outlet end; now, food may be placed in the pet drinking and eating disc for the pets to eat.

Furthermore, a notch is formed on a side cavity wall of the accommodating cavity, and the driving insert can be plugged into and fitted with the notch.

Moreover, in a third aspect, the present application provides a water dispenser, which comprises a pet water supply button, a person water dispensing portion arranged on the upper part of the water dispenser, and a pet water dispensing device arranged on the lower part of the water dispenser, and the pet water dispensing device and the person water dispensing portion share the same water source of the water dispenser. Thus, as described above, men and pets can share the same water dispenser, and the hygiene of the drinking water for the pets can be improved.

Furthermore, the pet water dispensing device is the pet water dispensing device according to any of the above-mentioned aspects.

Furthermore, the water dispenser comprises any pet drinking and eating disc described above in the second aspect.

Furthermore, the pet water dispensing device serves as a base of the water dispenser.

In a fourth aspect, the present application provides a pet food supply method, which comprises: placing a pet drinking and eating disc in a drinking and eating disc accommodating cavity of a pet water dispensing device, and driving a water supply valve to switch from a closed state to an open state to supply water into the pet drinking and eating disc when the pet drinking and eating disc drives a valve rod of the water supply valve of the pet water dispensing device; controlling the water supply valve in the closed state after the pet drinking and eating disc is removed.

Thus, as described above, when the pet drinking and eating disc is placed in the drinking and eating disc accommodating cavity and drives the valve rod of the water supply valve, the water supply valve is switched from a closed state to an open state, and thus water flows through the water outlet end of the water supply valve into the pet drinking and eating disc for the pets to drink; the water supply valve is switched to the closed state and no water flows out from the water outlet end once the pet drinking and eating disc is moved away from the drinking and eating disc accommodating cavity. Of course, a water supply barrel may be placed on the pet water dispensing device, and the water inlet end of the water supply valve may be connected to the water supply barrel; and the pet water dispensing device may be arranged on a person water dispenser to share the same water source, so that men and pets can share the same water dispenser.

Furthermore, the pet water dispensing device is configured to provide drinking and eating disc accommodating cavities at different positions, each of which has a separate water supply valve corresponding to it.

Furthermore, a driving insert is removably arranged on the pet drinking and eating disc, and when the driving insert is arranged on the pet drinking and eating disc and the pet drinking and eating disc is placed in the drinking and eating disc accommodating cavity, the driving insert can drive the water supply valve to the open state; after the driving insert is removed from the pet drinking and eating disc, the pet drinking and eating disc can't drive the water supply valve when the pet drinking and eating disc is placed in the drinking and eating disc accommodating cavity.

In a fifth aspect, the present application provides a pet food supply method, comprising arranging a pet water dispensing device on a person water dispenser to share the same water source with a person water dispensing portion of the person water dispenser, and pressing a pet water supply button on the person water dispenser to supply water into a pet drinking and eating disc. Thus, as described above, men and pets can share the same water dispenser, and the hygiene of the drinking water for the pets can be improved.

Furthermore, the pet food supply method comprises any pet food supply method described above in the fourth aspect, and the pet drinking and eating disc placed in the drinking and eating disc accommodating cavity drives the valve rod of the water supply valve of the pet water dispensing device so that the water supply valve is switched from the closed state to the open state, and the pet water supply button on the person water dispenser is pressed to supply water into the pet drinking and eating disc.

Furthermore, the pet water dispensing device is used as a base of the person water dispenser.

Other embodiments of the present application will be further detailed in the embodiments hereunder.

BRIEF DESCRIPTION OF THE DRAWINGS

The accompanying drawings are provided here to facilitate further understanding on the present application, and constitute a part of this document. They are used in conjunction with the following embodiments to explain the present application, but shall not be comprehended as constituting any limitation to the present application. In the figures.

REFERENCE NUMBERS

1—base; 2—drinking and eating disc accommodating cavity; 3—water supply valve; 4—water outlet end; 5—valve rod; 6—pet drinking and eating disc; 7—bottom plate; 8—boss; 9—inclined guide groove; 10—straight and level extension groove; 11—snap groove; 12—side cover plate; 13—arc groove; 14—lock piece; 15—arc clamp corner; 16—latch; 17—push block; 18—elastic member; 19—push plate; 20—end plate; 21—water inlet end; 22—water feeding pipe; 23—accommodating cavity; 24—disc body; 25—driving insert; 26—notch; 27—snap-fitting column.

DETAILED DESCRIPTION

Hereunder some embodiments of the present application will be detailed with reference to the accompanying drawings. It should be understood that the embodiments described here are only provided to describe and explain the present application rather than constitute any limitation to the present application.

Figure 1:
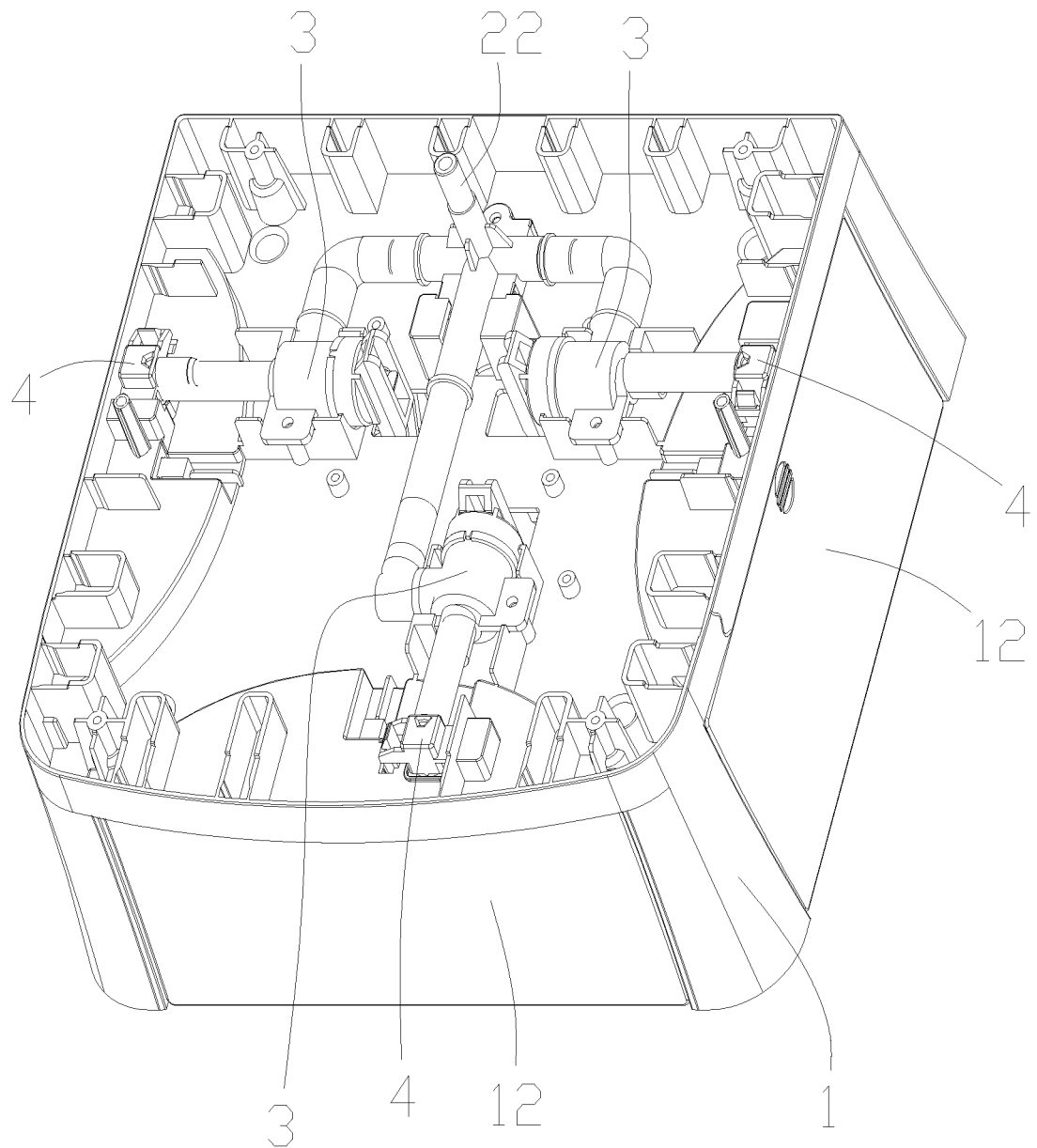
FIG. 1 is a pet water dispensing device provided in an embodiment of the present application.
Figure 2:
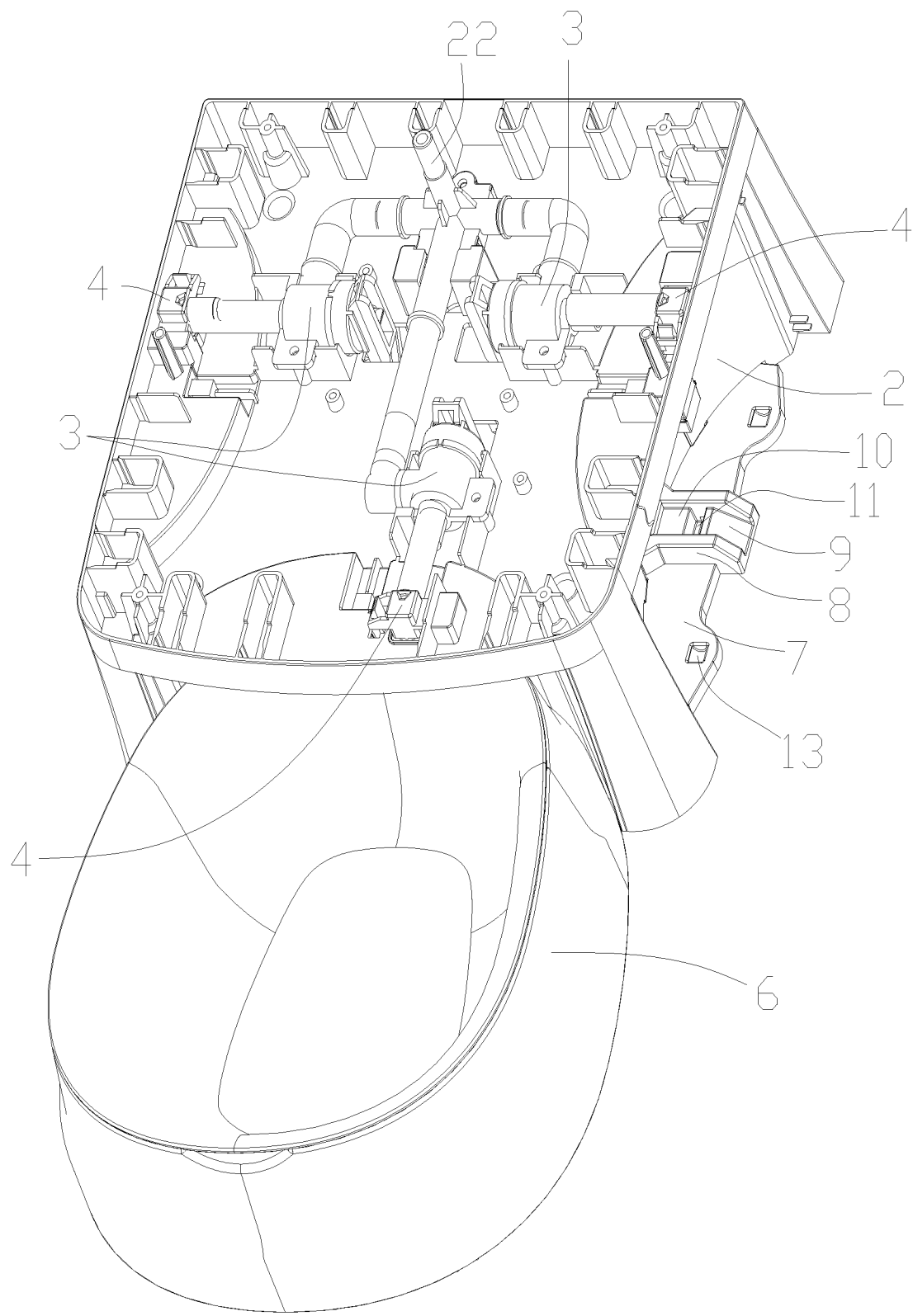
FIG. 2 is a schematic structural diagram of the pet water dispensing device in FIG. 1, with the pet drinking and eating disc placed therein, and the side cover plate is removed.
Figure 3:
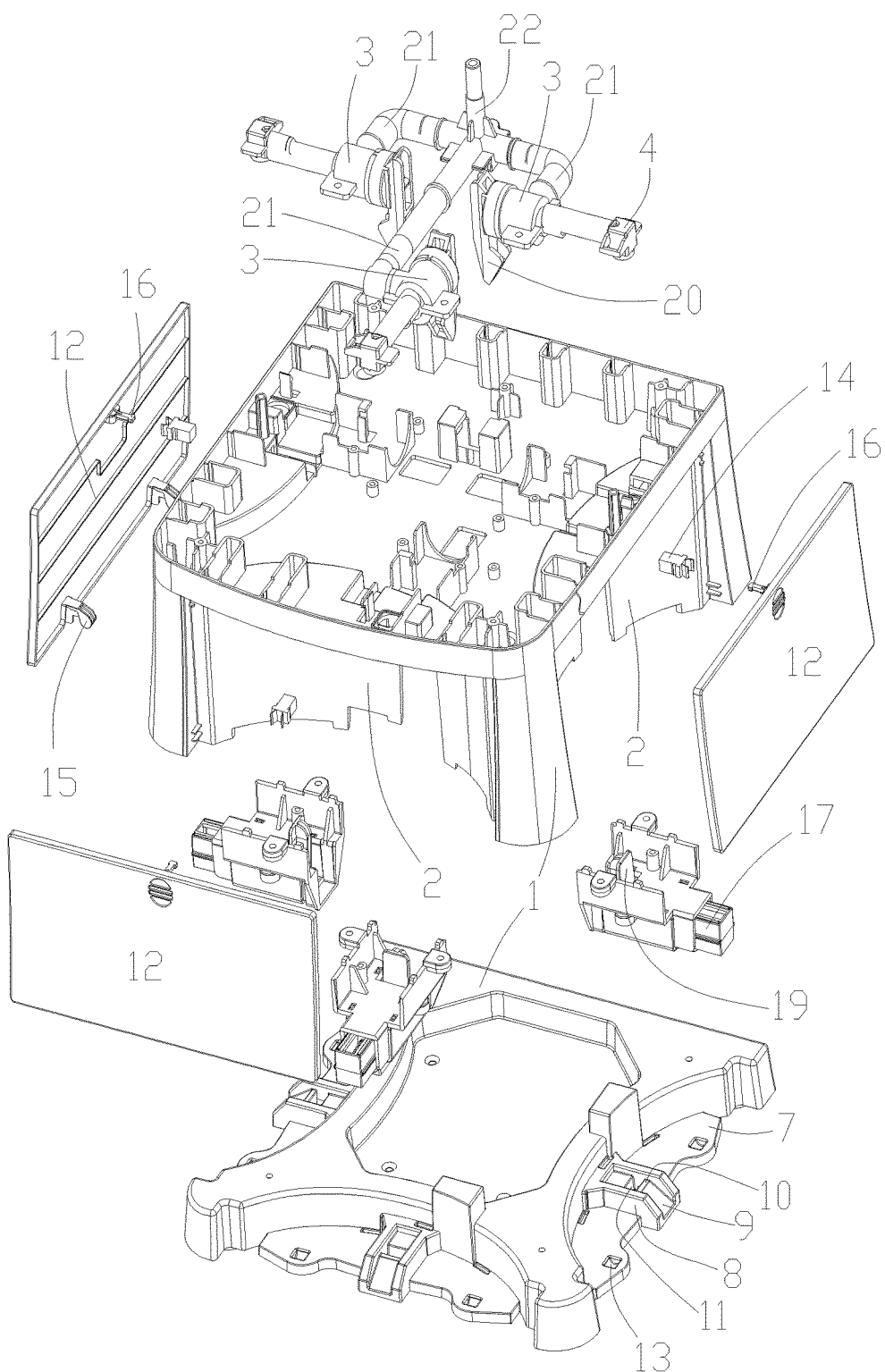
FIG. 3 is an exploded view of the pet water dispensing device in FIG. 1.
Figure 4:
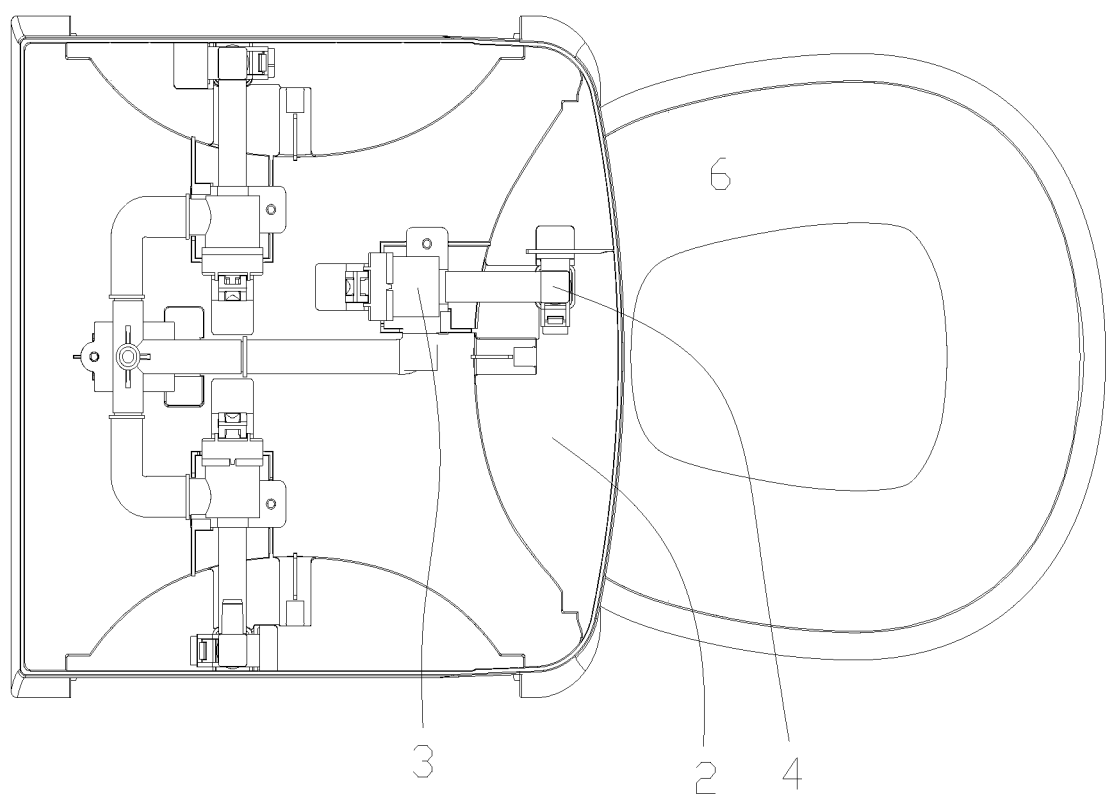
FIG. 4 is a top view of the structure of the pet water dispensing device in FIG. 1, with the pet drinking and eating disc placed therein.

In a first aspect, please see the structure shown in FIGS. 1-5, the pet water dispensing device provided in the present application comprises a base 1 and a water supply valve 3, and a drinking and eating disc accommodating cavity 2 is formed in at least one side surface of the base 1, which is to say, drinking and eating disc accommodating cavities 2 may be formed in one or more side surfaces of the base 1 as required; a water supply valve 3 corresponding to the drinking and eating disc accommodating cavity is arranged on the base 1, the water outlet end 4 of the water supply valve 3 communicates with the drinking and eating disc accommodating cavity 2 to supply water into the pet drinking and eating disc 6 placed in the drinking and eating disc accommodating cavity 2; that is to say, each drinking and eating disc accommodating cavity has a separate water supply valve corresponding to it; for example, as shown in FIG. 3, a drinking and eating disc accommodating cavity 2 is formed respectively in each of three side surfaces, and each drinking and eating disc accommodating cavity 2 has a water supply valve 3 corresponding to it; and when the extension end of the valve rod 5 of the water supply valve 3 is arranged to be driven by the pet drinking and eating disc 6 placed at the drinking and eating disc accommodating cavity 2, the water supply valve 3 is switched from a closed state to an open state.

In some embodiments, a drinking and eating disc accommodating cavity 2 is formed in at least one side surface of the base 1, a pet drinking and eating disc 6 may be placed in the drinking and eating disc accommodating cavity 2, and the water supply valve 3 may be switched from a closed state to an open state when the pet drinking and eating disc 6 drives the valve rod 5 of the water supply valve 3, so that water flows through the water outlet end 4 of the water supply valve 3 into the pet drinking and eating disc 6 for the pets to drink; the water supply valve 3 is switched to the closed state and no water flows out from the water outlet end 4 once the pet drinking and eating disc 6 is moved away from the drinking and eating disc accommodating cavity 2. Of course, a water supply barrel may be placed on the pet water dispensing device, and the water inlet end of the water supply valve may be connected to the water supply barrel; and the pet water dispensing device may be arranged on a person water dispenser to share the same water source, so that men and pets can share the same water dispenser.

Of course, after the pet drinking and eating disc 6 is removed from the drinking and eating disc accommodating cavity 2, the user may manually switch the water supply valve 3 from the open state to the closed state. In one embodiment, to improve the convenience of use and avoid any accidental improper operation by the user, the water supply valve 3 is configured to transmit from the open state to the closed state automatically once the pet drinking and eating disc 6 placed at the drinking and eating disc accommodating cavity 2 is removed. For example, a return spring connected with (e.g., sleeved on) the valve rod 5 may be arranged in the water supply valve 3, or the valve rod 5 may be driven by means of a push block 17 and an elastic member 18 as described below to return to its initial position, so that the water supply valve 3 is automatically switched from the open state to the closed state.

Figure 5:
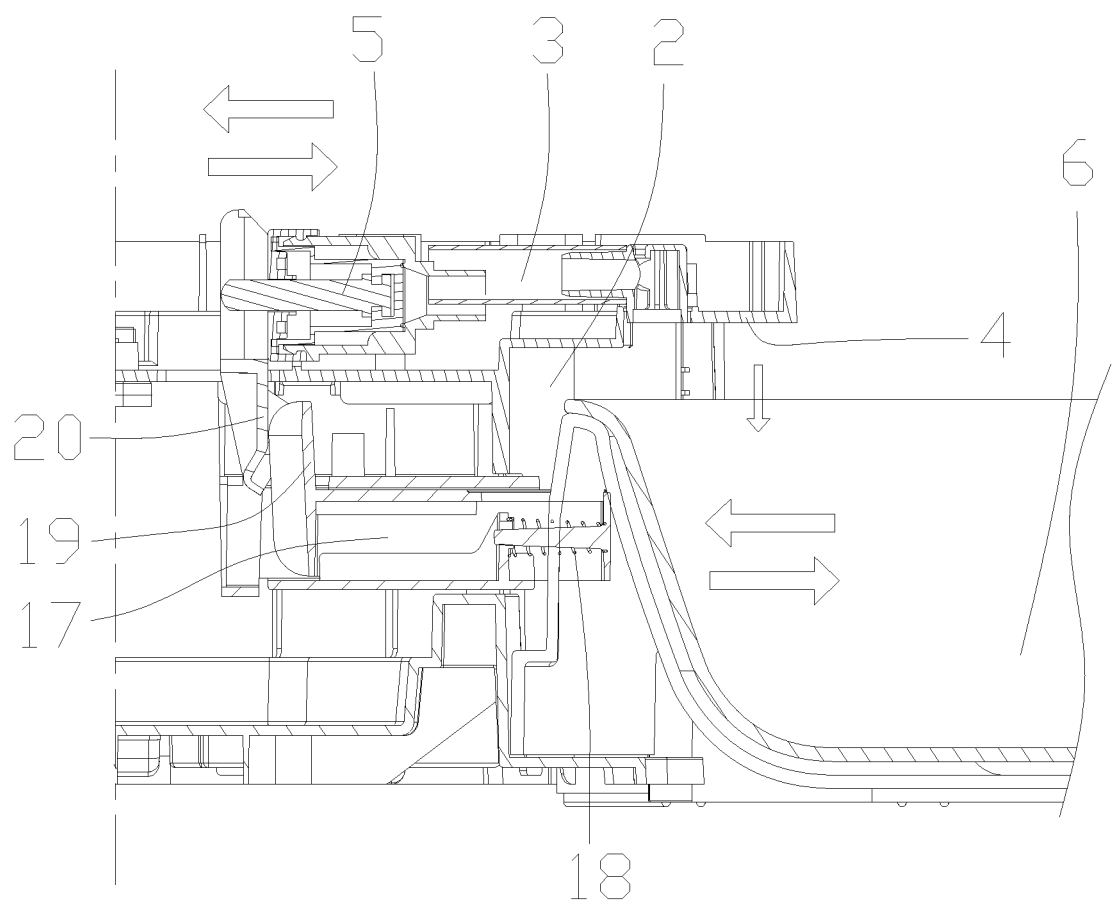
FIG. 5 is a broken-out sectional view of the structure of the pet water dispensing device in FIG. 1, with the pet drinking and eating disc placed therein.

Furthermore, the water outlet end 4 of the water supply valve 3 may be arranged at an appropriate position; for example, the water outlet end 4 may be connected with a water pipe extending into the drinking and eating disc accommodating cavity 2; or, to avoid water leakage from the connected pipe, as shown in FIG. 5, the water outlet end 4 of the water supply valve 3 extends into the drinking and eating disc accommodating cavity 2, and thus water leakage incurred by connection failure when the pipe is reconnected can be avoided; furthermore, to arrange the pet drinking and eating disc 6 stably and reliably at the drinking and eating disc accommodating cavity 2, a snap-fitting structure configured to keep the pet drinking and eating disc 6 in position may be arranged in the drinking and eating disc accommodating cavity 2, and, in that way, by fixing the pet drinking and eating disc 6 with the snap-fitting structure, the pet drinking and eating disc 6 reliably drives the valve rod 5 of the water supply valve 3 continuously when it drives the valve rod 5.

Furthermore, to snap-fit the pet drinking and eating disc 6 at the drinking and eating disc accommodating cavity 2 conveniently, a guide structure configured to guide the pet drinking and eating disc 6 into the drinking and eating disc accommodating cavity 2 and snap-fit with the snap-fitting structure is arranged in the drinking and eating disc accommodating cavity 2. Thus, utilizing the guiding function of the guide structure, the user can conveniently snap-fit the pet drinking and eating disc 6 at the drinking and eating disc accommodating cavity 2 along the guide structure.

Of course, the snap-fitting structure and the guide structure may be in any appropriate form, and may be arranged at any appropriate positions of the drinking and eating disc accommodating cavity 2. For example, in one embodiment, as shown in FIG. 2, the snap-fitting structure and the guide structure are formed on the same component. Thus, not only the structure can be simplified, but also the utilization of the components can be improved.

Figure 6:
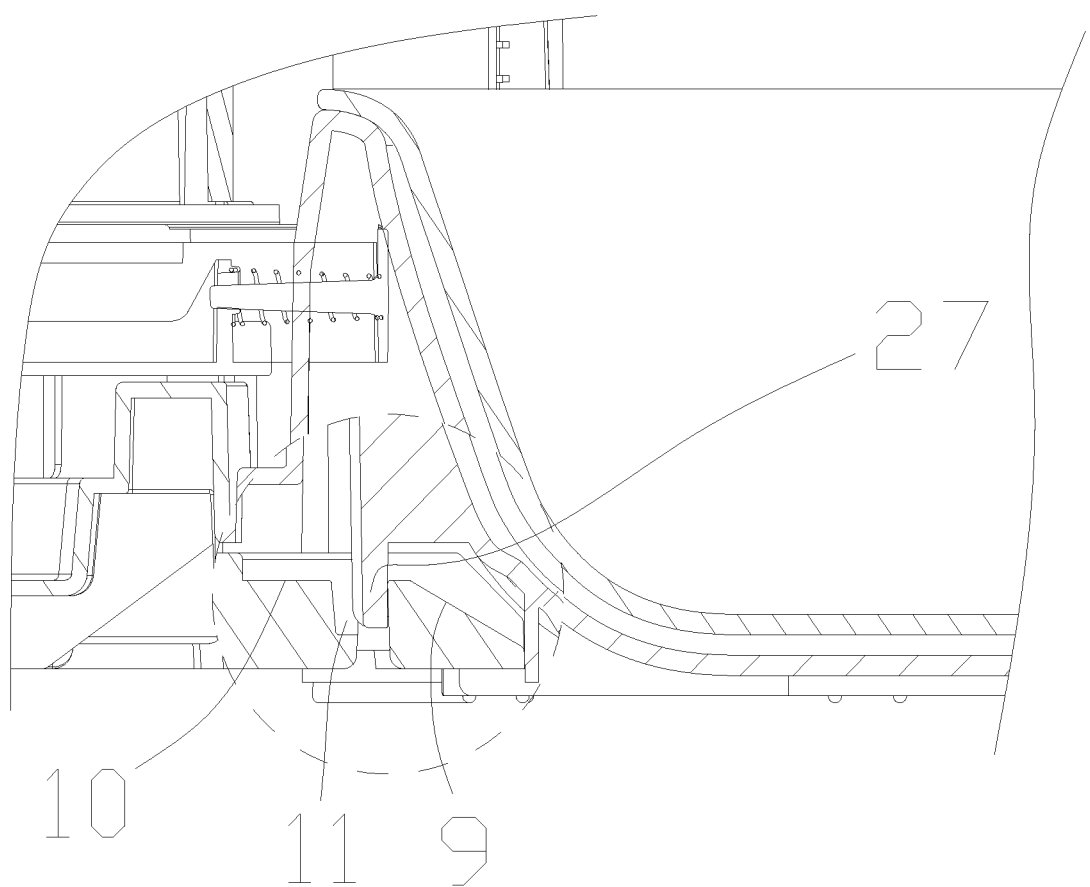
FIG. 6 is another broken-out sectional view of the pet water dispensing device in FIG. 1, with the pet drinking and eating disc placed therein.

Furthermore, as shown in FIGS. 2, 3, and 6, a boss 8 is formed on the central part of the bottom plate 7 of the food disc accommodating cavity 2, an inclined guide groove 9 and a straight and level extension groove 10 that communicate with each other sequentially are formed in the top surface of the boss 8 in the insertion direction of the pet drinking and eating disc 6, and a downward extending snap groove 11 is formed in the bottom surface of the straight and level extension groove 10, and the snap groove 11 serves as the snap-fitting structure, and the inclined guide groove 9 serves as the guide structure. Thus, as shown in FIG. 6, a snap-fitting column 27 on the pet drinking and eating disc 6 slides along the inclined guide groove 9 and the straight and level extension groove 10 to guide the pet drinking and eating disc 6; in addition, when the snap-fitting column 27 slides to the snap groove 11, it is snap-fitted in the snap groove 11 downwardly, and firmly fixes the pet drinking and eating disc 6 at the drinking and eating disc accommodating cavity 2. Moreover, the user may disengage the snap-fitting column 27 from the snap groove 11 quickly and conveniently and take out the pet drinking and eating disc 6 simply by pulling up the pet drinking and eating disc 6.

Of course, after the pet drinking and eating disc 6 is taken out, to protect the drinking and eating disc accommodating cavity 2, as shown in FIGS. 1, 2 and 3, the pet water dispensing device comprises a side cover plate 12, which can removably cover the drinking and eating disc accommodating cavity 2. Thus, when the pet drinking and eating disc 6 is not placed in the drinking and eating disc accommodating cavity 2, the user may cover the drinking and eating disc accommodating cavity 2 with the side cover plate 12 to prevent the water outlet end 4 from contaminated and improve the hygiene of the drinking water for the pets as well as the esthetic appearance of the pet water dispensing device.

Of course, the side cover plate 12 may be connected via any appropriate structure and cover the drinking and eating disc accommodating cavity 2. For example, one side of the side cover plate 12 may be connected to the bottom of the drinking and eating disc accommodating cavity 2 via a hinge; in addition, a releasable snap-fitting structure may be arranged between the inner side surface of the side cover plate 12 and the cavity wall of the drinking and eating disc accommodating cavity 2.

In one embodiment, as shown in FIG. 3, in another structural form, arc grooves 13 arranged in a spaced apart manner are formed in the bottom plate 7 of the drinking and eating disc accommodating cavity 2, and lock pieces 14 are formed on the cavity wall of the drinking and eating disc accommodating cavity 2; arc clamp corners 15 are formed on the bottom part of the inner surface of the side cover plate 12 and rotatably fitted in the arc grooves 13, and latches 16 that can be releasably locked to the lock pieces 14 are formed on the inner surface of the side cover plate 12. Thus, after the lock pieces 14 and the latches 16 are disengaged from each other, the side cover plate 12 may be removed; in the installation process, the arc clamp corners 15 may be placed in the arc grooves 13, and then the side cover plate 12 can be turned smoothly so that the lock pieces 14 and the latches are locked together.

In addition, the valve rod 5 of the water supply valve 3 may be arranged with an appropriate bendable structure, such as a bendable arm that can extend into the drinking and eating disc accommodating cavity 2, so that the pet drinking and eating disc 6 can be driven directly.

In one embodiment, in another structural form, as shown in FIGS. 3 and 5, the pet water dispensing device comprises a push block 17 slidably arranged on the base 1, and one end of the push block 17 extends into the drinking and eating disc accommodating cavity 2 so that it can be driven by the pet drinking and eating disc 6 placed at the drinking and eating disc accommodating cavity 2, and the other end of the push block 17 is connected to the valve rod 5 in transmission; thus, the valve rod of the water supply valve 3 can be utilized, instead of bending the valve rod 5 to form a complex structure. The pet drinking and eating disc 6 placed at the drinking and eating disc accommodating cavity 2 can drive the push block 17, which in turn drives the valve rod 5 to act, so that the water supply valve 3 enters into the open state.

Furthermore, as described above, to facilitate the push block 17 and the valve rod 5 to return to their initial positions, optionally, the push block 17 is connected with an elastic member 18, which starts to store energy when the push block 17 is driven by the pet drinking and eating disc 6 placed at the drinking and eating disc accommodating cavity 2. Of course, the elastic member 18 (e.g., a spring) can be compressed or extended to store energy. The push block 17 and the valve rod 5 can be drive to return to their initial positions when the elastic member 18 releases energy.

Furthermore, the other end of the push block 17 is connected with a push plate 19, the extension end of the valve rod 5 is connected with an end plate 20, and the push plate 19 and the end plate 20 are at the same position and fitted with each other. Thus, by means of the fitting between the push plate 19 and the end plate 20, the push block 17 and the valve rod 5 can act synchronously or essentially synchronously.

In another structural form, to facilitate the valve rod 5 to return to its initial position automatically, a spring sleeved on the valve rod 5 is arranged between the valve rod 5 in the water supply valve 3 and the valve shell of the water supply valve 3. The spring stores energy (e.g., it is compressed or extended) when the water supply valve 3 is switched from the closed state to the open state; the spring drives the valve rod 5 to return to the initial position when it releases energy.

In addition, to meet the drinking demand of several pets better, optionally, as shown in FIGS. 1, 2 and 3, a drinking and eating disc accommodating cavity 2 is arranged respectively in each of three side surfaces of the base 1; three water supply valves 3 are arranged on the base 1, water inlet ends 21 of the three water supply valves 3 are connected to the same water feeding pipe 22, and a water outlet end 4 of each of the water supply valves 3 extends into a respective drinking and eating disc accommodating cavity 2 corresponding to it and the extension end of the valve rod 5 of each water supply valve 3 is arranged to be driven by the pet drinking and eating disc 6 placed at the respective drinking and eating disc accommodating cavity 2 corresponding to it. Thus, corresponding pet drinking and eating discs 6 may be placed according to the quantity of the pets, and food possessive aggression of the pets incurred by several pets sharing the same pet drinking and eating disc can be avoided.

Figure 7:
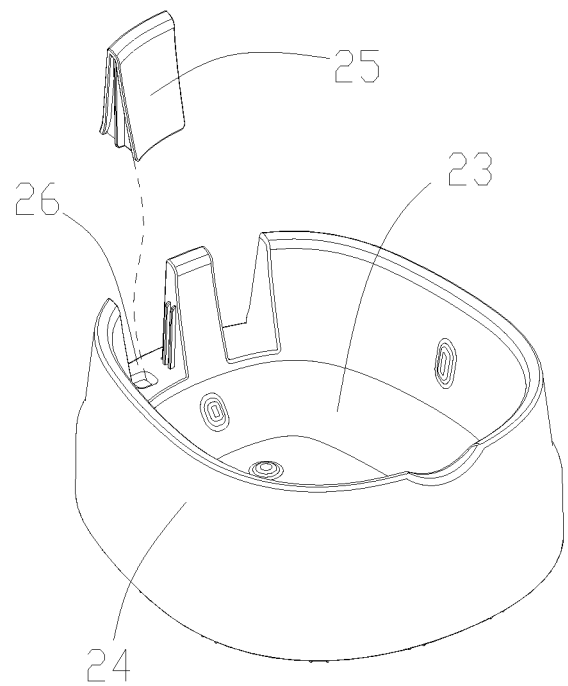
FIG. 7 is a exploded view of the pet drinking and eating disc provided in an embodiment of the present application.
Figure 8:
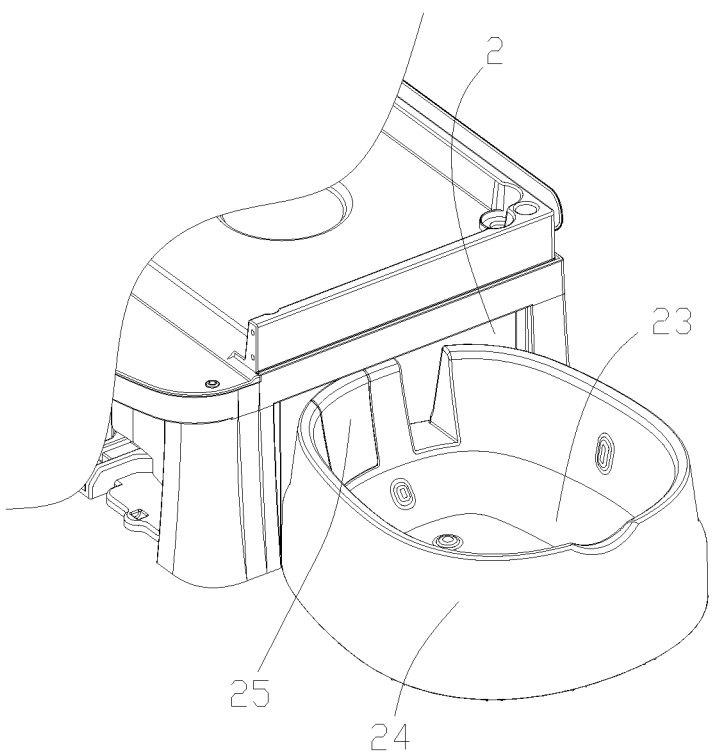
FIG. 8 shows the pet drinking and eating disc in FIG. 7 in an operating state.
Figure 9:
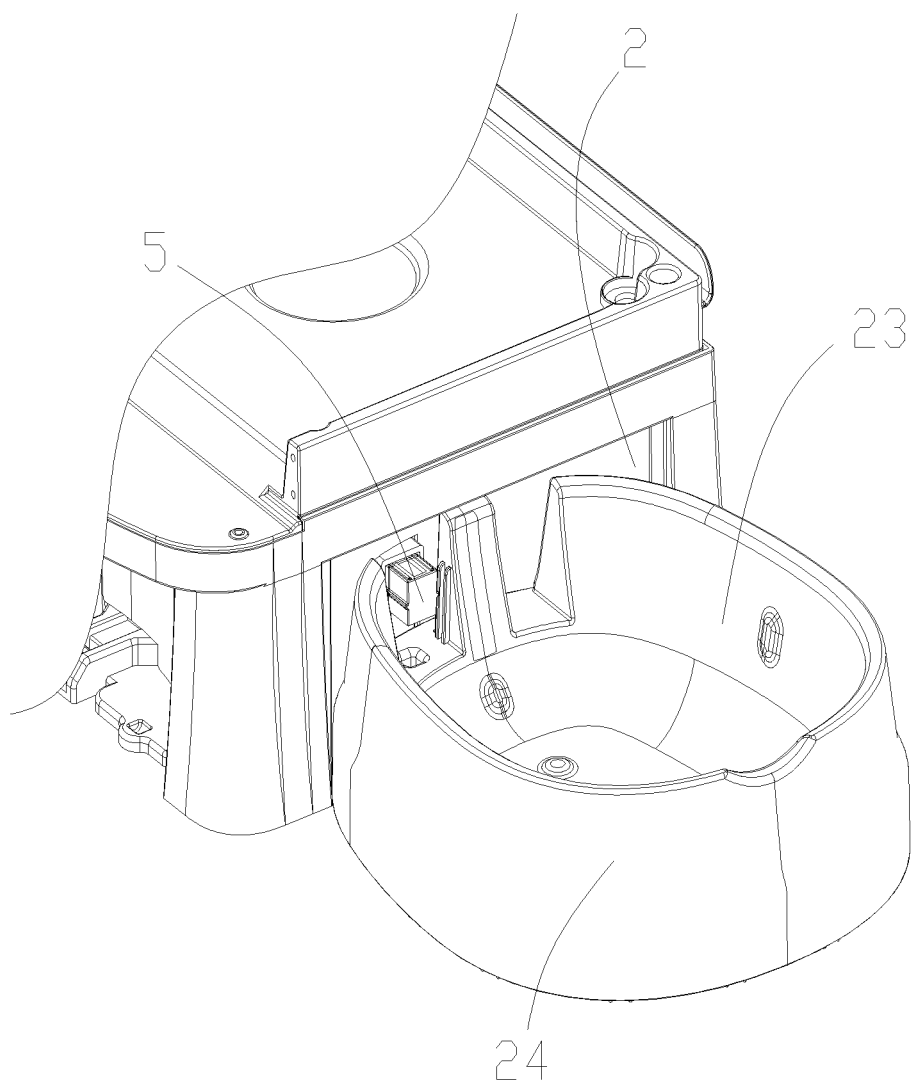
FIG. 9 shows the pet drinking and eating disc in FIG. 7 in another operating state.

In a second aspect, the present application further provides a pet drinking and eating disc, as shown in FIGS. 7, 8 and 9, which comprises a disc body 24 with an accommodating cavity 23 formed therein and a driving insert 25 removably arranged thereon, and the disc body 24 may be placed in a drinking and eating disc accommodating cavity 2 of any appropriate pet water dispensing device with a water supply valve 3, and whether to drive the valve rod 5 of the water supply valve can be determined according to the state of the driving insert 25. For example, when the driving insert 25 is arranged on the disc body 24 and the disc body 24 is placed in the drinking and eating disc accommodating cavity 2 of any appropriate pet water dispensing device with a water supply valve 3 (e.g., the drinking and eating disc accommodating cavity 2 of any pet water dispensing device described above), the driving insert 25 drives the valve rod 5 of the water supply valve 3 of the pet water dispensing device; when the disc body 24 is placed in the drinking and eating disc accommodating cavity 2 of any appropriate pet water dispensing device with a water supply valve 3 (e.g., the drinking and eating disc accommodating cavity 2 of any pet water dispensing device described above) after the driving insert 25 is removed from the disc body 24, the disc body 24 doesn't drive the valve rod 5 of the water supply valve 3 of the pet water dispensing device.

Thus, when the driving insert 25 is arranged on the disc body 24 and the pet drinking and eating disc is placed in the drinking and eating disc accommodating cavity 2, the pet drinking and eating disc can drive the valve rod 5 of the water supply valve 3, so that the water supply valve 3 is switched from a closed state to an open state, and water flows through the water outlet end 4 of the water supply valve 3 into the pet drinking and eating disc for the pets to drink; the water supply valve 3 is switched to the closed state once the pet drinking and eating disc is moved away from the drinking and eating disc accommodating cavity; after the driving insert 25 is removed from the disc body 24, the pet drinking and eating disc can't drive the valve rod 5 of the water supply valve 3 when the pet drinking and eating disc is placed in the drinking and eating disc accommodating cavity 2 because of absence of the driving insert 25; at that point, the water supply valve 3 is in the closed state and no water flows out from the water outlet end 4; now, food may be placed in the pet drinking and eating disc for the pets to eat. Thus, the pet drinking and eating disc has two functions, i.e., a water containing function and a food containing function.

Of course, it should be understood that the driving insert 25 may be arranged at any appropriate position of the disc body 24, as long as the above-mentioned effect can be realized.

Furthermore, to simplify the structure of the pet drinking and eating disc and take full advantage of the side walls of the pet drinking and eating disc, optionally, as shown in FIG. 7, a notch 26 is formed in the top part of the side cavity wall of the accommodating cavity 23, and the driving insert 25 may be plugged into and fitted with the notch 26. In that way, as shown in FIGS. 8 and 9, the driving insert 25 may be plugged according to the requirement. Of course, it should be understood that the notch 26 formed in the side cavity wall of the accommodating cavity 23 doesn't affect the water containing function of the accommodating cavity 23.

Of course, to facilitate the plug-in mounting of the driving insert 25, a plug-in mounting guide structure is formed between the side surface of the driving insert 25 and the inner side surface of the notch 26. For example, a slide channel and guide block fitting structure may be used, and one of the slide channel and the guide block may be formed on one of the side surface of the driving insert 25 and the inner side surface of the notch 26, while the other of the slide channel and the guide block may be formed on the other of the side surface of the driving insert 25 and the inner side surface of the notch 26, according to the specific requirement.

In a third aspect, the present application provide a water dispenser, i.e., a person water dispenser, which comprises a pet water supply button, a person water dispensing portion on the upper part of the water dispenser, and a pet water dispensing device on the lower part of the water dispenser, and the pet water dispensing device and the person water dispensing portion share the same water source of the water dispenser. Thus, when the user presses the pet water supply button, the water source of the water dispenser can supply water to the pet water dispensing device for the pets to drink; at the same time, men can obtain water from the person water dispensing portion arranged on the upper part of the water dispenser. In that way, men and pets can share the same water dispenser, and the hygiene of the drinking water for the pets can be improved.

Of course, the pet water dispensing device may be arranged at any appropriate position on the lower part of the water dispenser. For example, the pet water dispensing device may be arranged at an elevation above the ground.

In one embodiment, the pet water dispensing device is used as a base of the water dispenser. Thus, the pets can drink water conveniently, and the pet drinking and eating disc can be placed conveniently too, without providing a special supporting stand for supporting the pet drinking and eating disc on the lower part of the water dispenser.

In addition, it should be understood that the pet water dispensing device in the water dispenser provided in the present application may be in any appropriate structural form, as long as it can be arranged on the lower part of the water dispenser and share the same water source with the person water dispensing portion arranged on the upper part. For example, the pet water dispensing device in the water dispenser provided in the present application may be any pet water dispensing device described above in the first aspect. Thus, after the pet drinking and eating disc is placed in the drinking and eating disc accommodating cavity and drives the valve rod so that the water supply valve enters into the open state, when the user presses the pet water supply button, the water source of the water dispenser can supply water into the pet drinking and eating disc for the pets to drink; at the same time, men can obtain water from the person water dispensing portion arranged on the upper part of the water dispenser. In that way, men and pets can share the same water dispenser, and the hygiene of the drinking water for the pets can be improved.

Furthermore, the water dispenser may further comprise any pet drinking and eating disc described above in the second aspect. Thus, as described above, the pet drinking and eating disc has both water containing function and food containing function.

In a fourth aspect, the present application provides a pet food supply method, which comprises: placing a pet drinking and eating disc in a drinking and eating disc accommodating cavity of a pet water dispensing device, and driving a water supply valve to switch from a closed state to an open state to supply water into the pet drinking and eating disc when the pet drinking and eating disc drives a valve rod of the water supply valve of the pet water dispensing device; controlling the water supply valve in the closed state after the pet drinking and eating disc is removed.

Thus, as described above, when the pet drinking and eating disc is placed in the drinking and eating disc accommodating cavity and drives the valve rod of the water supply valve, the water supply valve is switched from a closed state to an open state, and thus water flows through the water outlet end of the water supply valve into the pet drinking and eating disc for the pets to drink; the water supply valve is switched to the closed state and no water flows out from the water outlet end once the pet drinking and eating disc is moved away from the drinking and eating disc accommodating cavity. Of course, a water supply barrel may be placed on the pet water dispensing device, and the water inlet end of the water supply valve may be connected to the water supply barrel and the pet water dispensing device may be arranged on a person water dispenser to share the same water source, so that men and pets can share the same water dispenser.

In addition, to meet the water drinking demand of several pets better, the pet water dispensing device is configured to provide drinking and eating disc accommodating cavities at different positions, each of which has a separate water supply valve corresponding to it. For example, as shown in FIGS. 1, 2 and 3, a drinking and eating disc accommodating cavity 2 is arranged respectively in each of three side surfaces of the base 1 of the pet water dispensing device; three water supply valves 3 are arranged on the base 1, water inlet ends 21 of the three water supply valves 3 are connected to the same water feeding pipe 22, and a water outlet end 4 of each of the water supply valves 3 extends into a respective drinking and eating disc accommodating cavity 2 corresponding to it, and the extension end of the valve rod 5 of each water supply valve 3 is arranged to be driven by the pet drinking and eating disc 6 placed at the respective drinking and eating disc accommodating cavity 2 corresponding to it. Thus, corresponding pet drinking and eating discs 6 may be placed according to the quantity of the pets, and food possessive aggression of the pets incurred by several pets sharing the same pet drinking and eating disc can be avoided.

In addition, to facilitate the pets to drink water and eat food, a driving insert is removably arranged on the pet drinking and eating disc, and when the driving insert is arranged on the pet drinking and eating disc and the pet drinking and eating disc is placed in the drinking and eating disc accommodating cavity, the driving insert can drive the water supply valve to the open state; after the driving insert is removed from the pet drinking and eating disc, the pet drinking and eating disc can't drive the water supply valve when the pet drinking and eating disc is placed in the drinking and eating disc accommodating cavity, so that the water supply valve is in a closed state. For example, in the case of the pet drinking and eating disc described above, when the driving insert 25 is arranged on the disc body 24 and the pet drinking and eating disc is placed in the drinking and eating disc accommodating cavity 2, the pet drinking and eating disc can drive the valve rod 5 of the water supply valve 3, so that the water supply valve 3 is switched from a closed state to an open state, and water flows through the water outlet end 4 of the water supply valve 3 into the pet drinking and eating disc for the pets to drink; the water supply valve 3 is switched to the closed state once the pet drinking and eating disc is moved away from the drinking and eating disc accommodating cavity; after the driving insert 25 is removed from the disc body 24, the pet drinking and eating disc can't drive the valve rod 5 of the water supply valve 3 when the pet drinking and eating disc is placed in the drinking and eating disc accommodating cavity 2 because of absence of the driving insert 25; at that point, the water supply valve 3 is in the closed state and no water flows out from the water outlet end 4; now, food may be placed in the pet drinking and eating disc for the pets to eat. Thus, the pet drinking and eating disc has two functions, i.e., a water containing function and a food containing function.

Of course, the pet food supply method provided in the fourth aspect may be used separately or in combination with a pet food supply method on a water dispenser described below, specifically:

In a fifth aspect, to enable men and pets to share the same water source, the present application provides a pet food supply method, comprising arranging a pet water dispensing device on a person water dispenser to share the same water source with a person water dispensing portion of the person water dispenser, and pressing a pet water supply button on the person water dispenser to supply water into a pet drinking and eating disc. Thus, as described above, men and pets can share the same water dispenser, and the hygiene of the drinking water for the pets can be improved.

Furthermore, the pet water dispensing device may be in any appropriate structural form, as long as it can be arranged on the lower part of a water dispenser and share the same water source with the person water dispensing portion arranged on the upper part. Therefore, the pet water dispensing device in the fifth aspect may be the pet water dispensing device in the fourth aspect. In that case, the pet food supply method in the fifth aspect comprises any pet food supply method in the fourth aspect, and when the pet drinking and eating disc placed in the drinking and eating disc accommodating cavity drives the valve rod of the water supply valve of the pet water dispensing device so that the water supply valve is switched from the closed state to the open state, water can be supplied into the pet drinking and eating disc once the pet water supply button on the person water dispenser is pressed. Thus, as described above, after the pet drinking and eating disc is placed in the drinking and eating disc accommodating cavity and drives the valve rod so that the water supply valve enters into the open state, when the user presses the pet water supply button, the water source of the water dispenser can supply water via the water outlet end of the water supply valve into the pet drinking and eating disc for the pets to drink; at the same time, men can obtain water from the person water dispensing portion arranged on the upper part of the water dispenser. In that way, men and pets can share the same water dispenser, and the hygiene of the drinking water for the pets can be improved.

Of course, the pet water dispensing device may be arranged at any appropriate position on the lower part of the water dispenser. For example, the pet water dispensing device may be arranged at an elevation above the ground.

In one embodiment, the pet water dispensing device is used as a base of a person water dispenser. Thus, the pets can drink water conveniently, and the pet drinking and eating disc can be placed conveniently too, without providing a special supporting stand for supporting the pet drinking and eating disc on the lower part of the water dispenser.

The invention claimed is:

1. A pet water dispensing device, comprising:
   a base, with a drinking and eating disc accommodating cavity formed in at least one side surface of the base; and
   a water supply valve corresponding to the drinking and eating disc accommodating cavity, arranged on the base, with a water outlet end communicated with the drinking and eating disc accommodating cavity; wherein
   the water supply valve is arranged to be switched from a closed state to an open state when an extension end of a valve rod of the water supply valve is driven by a pet drinking and eating disc at the drinking and eating disc accommodating cavity; and
   the pet water dispensing device comprises a push block slidably arranged on the base, one end of the push block extends into the drinking and eating disc accommodating cavity and configured be driven by the pet drinking and eating disc, and other end of the push block is connected to the valve rod in a transmission way.

2. The pet water dispensing device according to claim 1, wherein
   the water supply valve is arranged in a way that it can be switched from the open state to the closed state automatically once the pet drinking and eating disc placed at the drinking and eating disc accommodating cavity is removed.

3. The pet water dispensing device according to claim 1, wherein
   the drinking and eating disc accommodating cavity is provided on each of three side surfaces of the base;
   three water supply valves are arranged on the base, water inlet ends of the three water supply valves are connected to the same water feeding pipe, and a water outlet end of each of the water supply valves extends into a respective drinking and eating disc accommodating cavity corresponding to it;
   wherein,
   the extension end of the valve rod of each water supply valve is arranged to be driven by the pet drinking and eating disc placed at the respective drinking and eating disc accommodating cavity corresponding to it.

4. The pet water dispensing device according to claim 1, wherein the water outlet end extends into the drinking and eating disc accommodating cavity, and a snap-fitting structure configured to keep the pet drinking and eating disc in position is provided in the drinking and eating disc accommodating cavity.

5. The pet water dispensing device according to claim 4, wherein a guide structure configured to guide the pet drinking and eating disc into the drinking and eating disc accommodating cavity and snap-fit with the snap-fitting structure is provided in the drinking and eating disc accommodating cavity, the snap-fitting structure and the guide structure are formed on the same component.

6. The pet water dispensing device according to claim 5, wherein a boss is formed on a central part of a bottom plate of the drinking and eating disc accommodating cavity, an inclined guide groove and a straight and level extension groove that communicate with each other sequentially are formed in a top surface of the boss, and a downward extending snap groove is formed in the bottom surface of the straight and level extension groove, wherein, the snap groove serves as the snap-fitting structure, and the inclined guide groove serves as the guide structure.

7. The pet water dispensing device according to claim 1, wherein the pet water dispensing device comprises a side cover plate, which can removably cover the drinking and eating disc accommodating cavity.

8. The pet water dispensing device according to claim 7, wherein arc grooves arranged in a spaced apart manner are formed in a bottom plate of the drinking and eating disc accommodating cavity, and lock pieces are formed on a cavity wall of the drinking and eating disc accommodating cavity; arc clamp corners are formed on a bottom part of an inner surface of the side cover plate and rotatably fitted in the arc grooves, and latches that can be releasably locked to the lock pieces are formed on the inner surface of the side cover plate.

9. The pet water dispensing device according to claim 1, wherein the push block is connected with an elastic member, which starts to store energy when the push block is driven by the pet drinking and eating disc placed at the drinking and eating disc accommodating cavity, and/or the other end of the push block is connected with a push plate, the extension end of the valve rod is connected with an end plate, and the push plate and the end plate are at the same position and fitted with each other.

10. The pet water dispensing device according to claim 1, wherein in the water supply valve, a spring sleeved on the valve rod is arranged between the valve rod and a valve shell of the water supply valve, and the spring stores energy when the water supply valve is switched from the closed state to the open state.

11. A water dispenser, comprising the pet water dispensing device according to of claim 1 and at least one pet drinking and eating disc that is suitable for being placed in a drinking and eating disc accommodating cavity of the pet water dispensing device.

12. A water dispenser according to claim 11, wherein the pet drinking and eating disc comprise a disc body with an accommodating cavity, wherein a driving insert is detachably arranged on the disc body, wherein,
   when the driving insert is arranged on the disc body and the disc body is placed in the drinking and eating disc accommodating cavity of the pet water dispensing device, the driving insert drives the valve rod of the water supply valve of the pet water dispensing device;
   after the driving insert is moved away from the disc body, the disc body does not drive the valve rod of the water supply valve of the pet water dispensing device when the disc body is placed in the drinking and eating disc accommodating cavity of the pet water dispensing device.

13. A water dispenser according to claim 12, wherein a notch is formed on a side cavity wall of the accommodating cavity, and the driving insert can be plugged into and fitted with the notch.

14. A water dispenser according to claim 11, wherein the pet water dispensing device serves as the base of the water dispenser.

\* \* \* \* \*